(12) United States Patent
Zhao et al.

(10) Patent No.: US 12,546,673 B2
(45) Date of Patent: Feb. 10, 2026

(54) HEAVY-DUTY, HIGH-POWER AND LARGE-TORQUE CHASSIS DYNAMOMETER FOR MULTI-ENVIRONMENTAL SYSTEM

(71) Applicant: JiangSu XCMG Construction Machinery Research Institute LTD., Jiangsu (CN)

(72) Inventors: Bin Zhao, Jiangsu (CN); Hanguang Liu, Jiangsu (CN); Wei Xu, Jiangsu (CN); Cheng Huang, Jiangsu (CN); Lei Tian, Jiangsu (CN)

(73) Assignee: JiangSu XCMG Construction Machinery Research Institute LTD., Jiangsu (CN)

( * ) Notice: Subject to any disclaimer, the term of this patent is extended or adjusted under 35 U.S.C. 154(b) by 394 days.

(21) Appl. No.: 18/276,255

(22) PCT Filed: Mar. 2, 2021

(86) PCT No.: PCT/CN2021/078600
§ 371 (c)(1),
(2) Date: Aug. 8, 2023

(87) PCT Pub. No.: WO2022/174474
PCT Pub. Date: Aug. 25, 2022

(65) Prior Publication Data
US 2024/0118155 A1 Apr. 11, 2024

(30) Foreign Application Priority Data
Feb. 22, 2021 (CN) .......................... 202110196994.9

(51) Int. Cl.
G01L 5/13 (2006.01)
(52) U.S. Cl.
CPC ..................................... G01L 5/13 (2013.01)

(58) Field of Classification Search
CPC ....................................................... G01L 5/13
See application file for complete search history.

(56) References Cited

U.S. PATENT DOCUMENTS 3,886,788 A * 6/1975 Jeter, Jr. ............ G01M 17/0074
73/116.11
3,905,225 A * 9/1975 Moss ........................ G01L 5/13
73/116.06

(Continued)

FOREIGN PATENT DOCUMENTS

| CN | 201212854 | 3/2009 |
| CN | 205941233 | 2/2017 |

(Continued)

OTHER PUBLICATIONS

"International Search Report (Form PCT/ISA/210) of PCT/CN2021/078600", mailed on Nov. 23, 2021, with English translation thereof, pp. 1-6.

(Continued)

*Primary Examiner* — Eric S. McCall
(74) *Attorney, Agent, or Firm* — JCIPRNET

(57) ABSTRACT

A heavy-duty, high-power and large-torque chassis dynamometer for a multi-environmental system, comprising a power testing platform disposed on the ground and a rack located below the power testing platform. A fixed base and a sliding base are sequentially disposed on an inner side of the rack in a length direction of the power testing platform, a pair of first hub assemblies are mounted on the fixed base through a plurality of support frames, a sliding platform is disposed on the sliding base, and a pair of second hub assemblies are mounted on the sliding platform through a plurality of support frames. Tension sensor assemblies are connected to outer circumferences of the first hub assem- (Continued)

blies and outer circumferences of the second hub assemblies, and are fixedly disposed on the support frames.

10 Claims, 9 Drawing Sheets

(56) References Cited

U.S. PATENT DOCUMENTS

| | | | | |
|---|---|---|---|---|
| 5,154,076 | A * | 10/1992 | Wilson | G01L 3/22 |
| | | | | 73/116.06 |
| 12,113,470 | B2 * | 10/2024 | Bian | H02P 6/08 |
| 2004/0200272 | A1 * | 10/2004 | Bergst | G01L 5/282 |
| | | | | 73/123 |
| 2008/0011072 | A1 * | 1/2008 | Bergeron | G01M 17/0074 |
| | | | | 73/116.05 |
| 2011/0083499 | A1 | 4/2011 | Evers | |
| 2015/0369702 | A1 * | 12/2015 | Barnes | G01M 13/025 |
| | | | | 73/116.06 |
| 2024/0125660 | A1 * | 4/2024 | Liu | G01L 3/16 |

FOREIGN PATENT DOCUMENTS

| | | |
|---|---|---|
| CN | 108132155 | 6/2018 |
| CN | 108692961 | 10/2018 |
| CN | 108760341 | 11/2018 |
| CN | 208399061 | 1/2019 |
| CN | 110501170 | 11/2019 |
| CN | 111238827 | 6/2020 |

OTHER PUBLICATIONS

"Office Action of China Counterpart Application", issued on Dec. 28, 2021, p. 1-p. 4, 202110196994. 9.

* cited by examiner

HEAVY-DUTY, HIGH-POWER AND LARGE-TORQUE CHASSIS DYNAMOMETER FOR MULTI-ENVIRONMENTAL SYSTEM

CROSS-REFERENCE TO RELATED APPLICATION

This application is a 371 of international application of PCT application serial no. PCT/CN2021/078600, filed on Mar. 2, 2021, which claims the priority benefit of China application no. 202110196994.9, filed on Feb. 22, 2021. The entirety of each of the above mentioned patent applications is hereby incorporated by reference herein and made a part of this specification.

BACKGROUND OF THE INVENTION

Technical Field

The invention relates to the technical field of dynamometers, in particular to a heavy-duty, high-power and large-torque chassis dynamometer for a multi-environmental system.

Description of Related Art

The chassis dynamometer is an indoor bench test facility used for testing the dynamic property, multi-condition emission index, fuel index, pure-electric mileage and other properties of automobiles and engineering vehicles. The chassis dynamometer calculates a road simulation equation by simulating a road through rollers and can accurately simulate the working condition of automobiles and engineering vehicles, and it can be used for debugging automobiles and engineering vehicles by loading and diagnosing faults of vehicles under a load condition. The chassis dynamometer is convenient to use and reliable in performance, will not be affected by external conditions, and can accurately and rapidly detect the service performance of systems and components of automobiles without disassembling the automobiles. The chassis dynamometer not only can be used for scientific experiments of automobiles, but also can be used for maintenance and detection.

For example, Chinese Utility Model Patent (Publication No. CN201212854) disclosed, in 2009, a hub chassis dynamometer, which comprises supports and lifting and centering propulsion mechanisms symmetrically disposed on front and back sides of hubs. Each lifting-centering propulsion mechanism is composed of screws, nuts and pushing arms which are arranged bilaterally symmetrically, wherein the screws are rotatably mounted on the corresponding support, a horizontal smaller support roller is disposed between front ends of the pushing arms, rear ends of the pushing arms are connected to the nuts, wheels are mounted at front and back ends to be matched with a rail on the corresponding support, and the middle of the rail is arched. The corresponding screws of the lifting and centering propulsion mechanisms are coaxially connected, and power input ends of the lifting and centering propulsion mechanisms are connected to output ends of reducers on outer sides of the supports, and the reducers are driven by a motor. The hub chassis dynamometer can realize accurate location and alignment of wheels, has a lifting function and a protection function, and can be used for an automobile hub test bench. However, the hub chassis dynamometer has a complex transmission structure, which makes it hard to greatly improve the torque and power, and it is not suitable for testing the power of heavy-duty trucks and large vehicles.

In addition, existing dynamometers are poor in flexibility and cannot adjust the center distance between front and back hubs according to different wheelbases, so multiple power testing systems are needed for vehicles of different models.

BRIEF SUMMARY OF THE INVENTION

The objective of the invention is to solve the problems in the prior art by providing a heavy-duty, high-power and large-torque chassis dynamometer for a multi-environmental system.

To fulfill the above objective, the technical solution adopted by the invention is as follows:

A heavy-duty, high-power and large-torque chassis dynamometer for a multi-environmental system comprises a power testing platform and a rack located below the power testing platform, wherein a fixed base and a sliding base are disposed on the rack, support frames are mounted on the fixed base and the sliding base, and a plurality of hub assemblies are disposed on the support frames;

Each hub assembly comprises a transmission shaft and a hub connected to the transmission shaft, a plurality of brake assemblies are disposed between an end, extending outwards, of the transmission shaft and the corresponding support frame, and a side, close to the hub, of the transmission shaft is sleeved with a driving assembly; two ends of the driving assembly are sleeved with bearing assemblies respectively and are disposed on the corresponding support frames through motor mounting bases, a plurality of tension sensor assemblies are disposed between an outer circumference of the driving assembly and the corresponding support frame, and the hubs partially stretch out of the power testing platform;

Specifically, the hub assemblies comprise first hub assemblies and second hub assemblies, a pair of first hub assemblies are mounted on the fixed base through support frames, a sliding platform is disposed on the sliding base, and a pair of second hub assemblies are mounted on the sliding platform through support frames;

The first hub assemblies each comprise a first hub and a first transmission shaft coaxial with the first hub, wherein one end of the first transmission shaft stretches into the first hub and is connected to the first hub, the other end of the first transmission shaft extends outwards and is provided with an end flange plate, and a plurality of brake assemblies are disposed on the end flange plate; a side, close to the first hub, of the first transmission shaft is sleeved with a first driving assembly, and bearing assemblies are disposed on two sides of the first driving assembly in an axial direction respectively;

The second hub assemblies each comprise a second hub and a second transmission shaft coaxial with the second hub, wherein one end of the second transmission shaft stretches into the second hub and is connected to the second hub, the other end of the second transmission shaft extends outwards and is provided with an end flange plate, and a plurality of brake assemblies are disposed on the end flange plate; a side, close to the second hub, of the second transmission shaft is sleeved with a second driving assembly, and bearing assemblies are disposed on two sides of the second driving assembly in the axial direction respectively;

The bearing assemblies are mounted on the support frames on the corresponding sides through motor mounting bases respectively; tension sensor assemblies are connected to an outer circumference of the first driving assembly and an outer circumference of the second driving assembly respectively and are fixedly disposed on the support frames; and the first hub and the second hub are arranged in parallel, part of an outer circumference of the first hub and part of an outer circumference of the first hub are exposed out of the power testing platform, and the height of the first hub exposed out of the power testing platform is the same as that of the second hub exposed out of the power testing platform.

The dynamometer has the characteristics of heavy duty, high power and large torque; a pair of first hub assemblies are arranged fixedly and a pair of second hub assemblies are arranged slidably, such that the center distance between the two pairs of hub assemblies can be adjusted to test the power of the chassis of different heavy-duty trucks, multiple groups of front wheels can be tested, and front wheels and rear wheels can be tested synchronously, so the application range is wide; each hub assembly is provided with the driving assembly, the brake assemblies and the tension sensor assemblies, such that wheels can be tested separately, jointly and differentially to obtain the performance and data of the wheels and chassis more comprehensively; and an environmental test chamber used for simulating one or more environments is arranged to simulate environmental systems under different temperature, humidity and air pressure conditions, such that the performance of a vehicle to be tested can be reflected more accurately.

Through the sliding base and the sliding platform, the pair of second hub assemblies which are arranged coaxially can be driven synchronously to adjust the distance to the first hub assemblies, and the adjustment range reaches 3000-8500 mm, that is, the minimum distance is less than or equal to 3000 mm and the maximum distance is over 8500 mm.

Hubs used for testing the chassis of heavy-duty truck have a large size. In the invention, the driving assemblies are arranged in the hubs, such that the axial size can be greatly reduced, the length of the transmission shafts is decreased, the transmission shafts and the hubs can be mounted only through the bearing assemblies and the motor mounting bases, the structure is compact, and the support capacity is guaranteed under the precondition that the axial size is reduced.

The tension sensor assemblies are disposed on outer sides of the driving assemblies, so the tension sensor assemblies can support the driving assemblies and directly obtain the stress of the hubs; and the brake assemblies can fulfill a brake function to control the rotational speed of the transmission shafts or stop the transmission shafts and the hubs from rotating.

The first hub assemblies and the second hub assemblies are disposed below the power testing platform (under the ground), and only a small part of the outer circumference of the first hub assemblies and a small part of the outer circumference of the second hub assemblies are located above the power testing platform (over the ground), such that vehicles can be driven onto the hubs directly from the power testing platform; and assemblies in the hubs and other components below the power testing platform can be prevented from being exposed to the environmental test chamber over the ground, such that the influence of the simulation of an environmental system in the environmental test chamber on the driving and transmission systems of the dynamometer is reduced, thus reducing test errors.

Preferably, the transmission shafts are hollow connecting shafts, and encoders are connected to and mounted on the end flange plates to obtain the rotational speed, rotation angle and other information of the transmission shafts.

Further, the support frame is a plate frame structure and comprises a base plate which is bolted and mounted on the fixed base or the sliding platform, side plates are disposed on two sides of the base plate, a plurality of arc-shaped support plates are disposed between the side plates, and the motor mounting base is disposed on the arc-shaped support plates; the two ends of the motor mounting base in the axial direction are connected to the bearing assemblies respectively, an end, away from the end flange plate, of the motor mounting base stretches into the first hub or the second hub, a first mounting plate is connected to an outer side of the other end of the motor mounting base, and the brake assemblies are mounted on the first mounting plate; and second mounting plates are disposed on outer sides of the side plates, and the tension sensor assemblies are mounted on the second mounting plates.

The support frame is made by welding plates, and the two arc-shaped support plates can support and fix the motor mounting base to support the corresponding transmission shaft and hub; the driving assemblies are further supported by the tension sensor assemblies stably to form cantilever supporting and connecting structures, which rotationally support the hubs together with the brake assemblies at the ends and reduce the axial width.

Further, at least two arc-shaped support plates are arranged in parallel, one arc-shaped support plate is disposed on and supports one end of the motor mounting base, and the other arc-shaped support plate is disposed in and supports the middle of the motor mounting base; a plurality of oblique rib plates are disposed between the arc-shaped support plates and the base plate, as well as between the arc-shaped support plates and the outer circumference of the motor mounting base, and the bottom and two sides of the first mounting plate are connected to the oblique rib plates on the corresponding sides respectively; and a plurality of through grooves are formed in the arc-shaped support plates close to the end of the motor mounting base, and a radial through groove is formed in the outer circumference of the motor mounting base.

The arc-shaped support plate on the outer side is exactly flush with an outer end face of the motor mounting base, and the arc-shaped support plate on the inner side supports the middle of the motor mounting base and is close to the end of the hub, such that the hub is supported and can rotate without being affected; and the oblique rib plates can improve the connecting strength, and the oblique rib plates on inner and outer sides have different installation positions and sizes, thus fulfilling different effects under the condition of improving the connecting capacity.

Further, the side plate is a multi-step trapezoidal plate, the size of the upper portion of the side plate is less than that of the lower portion of the side plate, and the side plate in this shape can enlarge the support area and occupy less space, and components above can be connected more compactly; the center of the side plate is located in the plane where the center line of the base plate is located, so the stability is better; the motor mounting base is a semicircular groove structure, and the first driving assembly or the second driving assembly is disposed in the semicircular groove structure; and two sides, close to the side plates, of the outer circumference of the motor mounting base are planar structures and closely abut against inner sides of the side plates, and grooves are formed in the outer circumference of the motor mounting base close to steps of the side plates to be used for connecting and mounting the tension sensor assemblies.

Further, the bearing assembly comprises main bearings disposed around the driving assembly, wherein the main bearings are mounted at two ends of the motor mounting base in the axial direction respectively and are provided with bearing end caps on inner and outer sides, and the bearing end caps abut against and are bolted to the motor mounting base, a bearing pressing plate is disposed between the bearing end caps, and the bearing pressing plate is arc-shaped and has two ends bolted to the motor mounting base. The bearing end caps can be further fixed on the motor mounting base through the bearing pressing plates.

Specifically, the main bearings are disposed at two ends of a shell of the first driving assembly (or the second driving assembly), the first transmission shaft (or the second transmission shaft) is not directly connected to the main bearings, and a bearing is disposed between the first driving assembly and the first transmission shaft (or between the second driving assembly and the second transmission shaft).

Further, the plurality of hubs each comprise a hub body, wherein a mounting surface is disposed on an inner circumference of the hub body and is connected to the end of the transmission shaft; and a plurality of circumferential reinforcing ribs are disposed on the inner circumference of the hub body, and a plurality of through holes are formed in the mounting surface in the axial direction.

Specifically, the first hub and the second hub comprise hub bodies which are identical in outer contour and outer diameter, a mounting surface is disposed on an inner circumference of the hub body, a stepped connecting sleeve is disposed in the middle of the mounting surface, and the first expandable sleeve is sleeved with the connecting sleeve and is disposed around the end of the first transmission shaft or the second transmission shaft; a plurality of circumferential reinforcing ribs are disposed on the inner circumference of the hub body; in the first hub assembly, and the circumferential reinforcing ribs are symmetrical with the mounting surface or are symmetrically disposed on two sides of the mounting surface respectively; and a plurality of through holes are formed in the mounting surface in the axial direction. An axis of the first transmission shaft and an axis of the second transmission shaft are located in the same horizontal plane.

By adopting this structure, the internal space can be reasonably used for installing other parts under the condition that a large size of the outer circumference is guaranteed; because the power and size of the first driving assembly are different from those of the second driving assembly, the positions of the mounting surfaces in the hub bodies may be different; and by arranging the circumferential reinforcing ribs, the strength of the hub body can be further improved.

The coaxiality of the first hub assemblies or the second hub assemblies which are arranged coaxially is less than or equal to 0.5 mm, and the degree of parallelism of the first hub assemblies and the second hub assemblies which are arranged in the front-back direction is less than or equal to 1 mm.

Further, the pair of brake assemblies are arranged symmetrically and each comprise a brake mount, brakes are mounted on the brake mounts respectively, the brakes are clamp brakes, and a pair of clamps of each brake are disposed on inner and outer sides of the corresponding end flange plate respectively; and the brake mount comprises a first connecting plate, a pair of second connecting plates and a third connecting plate, the first connecting plate is bolted to the support frame, the pair of second connecting plates are disposed between the first connecting plate and the third connecting plate, an acute angle is formed between the third connecting plate and the first connecting plate, the brake is bolted to the third connecting plate, and receding grooves are formed in ends, close to the clamps, of the third connecting plate without affecting rotational movement of the end flange plate. Braking is performed at two symmetrical angles, such that the braking effect is better; and the space of the outer side is reasonably used, such that less space is occupied.

Further, the tension sensor assembly comprises a tension base which is bolted and fixed to the outer circumference of the first driving assembly or the second driving assembly, a tie-rod nut is connected to the tension base, a screw is connected to the end of the tie-rod nut, and a tension sensor is bolted to the end of the screw and is bolted and fixed to the support frame; and one pair of tension sensor assemblies are symmetrically disposed on the outer circumference of each first driving assembly or each second driving assembly.

Further, one end of the sliding base is bolted and fixed to one end of the fixed base, a plurality of sliding rails and guide rails are disposed on the sliding base, the sliding platform is slidably disposed on the sliding rails and the guide rails, and the sliding platform is connected to a drive through a transmission assembly; upper cover plates are detachably mounted on two sides of the power testing platform located above the sliding base, a vehicle moves on the upper cover plates, the underground space and the environmental test chamber over the ground can be separated by the upper cover plates, and upper cover plates detachably connected to the power testing platform can be flexibly adjusted according to the center distance between the front hubs and the rear hubs; and the rack is a steel frame structure, and is connected to and supports the power testing platform.

Further, the first driving assembly and the second driving assembly are direct drive motors or permanent magnet synchronous motors and can direct act on and drive the corresponding transmission shafts to rotate so as to drive the hubs to rotate; the first driving assembly and the second driving assembly each comprises a shell in the circumferential direction and covers at the ends, the covers are bolted to two sides of the shell respectively, the middle of each cover protrudes outwards and is connected to the corresponding bearing assembly, and a plurality of wire holes and air holes are formed in the covers in the axial direction; and stator assemblies of motors are mounted in the shell, and rotor parts of the motors are disposed around and connected to the transmission shafts.

The permanent magnet synchronous motors are used for driving, such that a large-torque output environment can be provided, the response speed is high, the rotational speed can be controlled easily, the structure is compact, and the permanent magnet synchronous motors can be directly mounted on the transmission shafts to drive the transmission shafts to rotate so as to drive the hubs to rotate; and the shell and the covers are bolted and fixed, and the covers are connected to the motor mounting base through the bearing assemblies, such that the driving assemblies and the corresponding transmission shafts can rotate on the corresponding motor mounting base, the shell does not contact the motor mounting base directly and is supported by the pressure sensor assemblies connected to the outer side of the shell.

Compared with the prior art, the invention has the following beneficial effects: 1, the dynamometer has the characteristics of stable structure, multiple test functions, heavy duty, high power and large torque; one pair of hub assemblies are arranged fixedly and the other pair of hub assemblies are arranged slidably, such that the center distance between the two pairs of hub assemblies can be adjusted to test the power of the chassis of different heavy-duty trucks, multiple groups of front wheels can be tested, and front wheels and rear wheels can be tested synchronously, so the application range is wide; each hub assembly is provided with the driving assembly, the brake assemblies and the tension sensor assemblies, such that wheels can be tested separately, jointly and differentially to obtain the performance and data of the wheels and chassis more comprehensively; and the environmental test chamber is arranged to simulate environmental systems under different temperature, humidity and air pressure conditions, such that the performance of a vehicle to be tested can be reflected more accurately; 2, through the sliding base and the sliding platform, the pair of second hub assemblies which are arranged coaxially can be driven synchronously to adjust the distance to the first hub assemblies, and the adjustment range reaches 3000-8500 mm, that is, the minimum distance is less than or equal to 3000 mm and the maximum distance is over 8500 mm; 3, by adopting the structure in the invention, the axial size can be greatly reduced, the length of the transmission shafts is decreased, the structure is compact, and the support capacity is guaranteed under the precondition that the axial size is reduced; 4, the tension sensor assemblies are disposed on outer sides of the driving assemblies, so the tension sensor assemblies can support the driving assemblies and directly obtain the stress of the hubs; and the brake assemblies can fulfill a brake function to control the rotational speed of the transmission shafts or stop the transmission shafts and the hubs from rotating; 5, the first hub assemblies and the second hub assemblies are disposed below the power testing platform, and only a small part of the outer circumference of the first hub assemblies and a small part of the outer circumference of the second hub assemblies are located above the power testing platform, such that vehicles can be driven onto the hubs directly from the power testing platform; and assemblies in the hubs and other components below the power testing platform can be prevented from being exposed to the environmental test chamber over the ground, such that the influence of the simulation of an environmental system in the environmental test chamber on the driving and transmission systems of the dynamometer is reduced, thus reducing test errors.

DETAILED DESCRIPTION OF THE INVENTION

The technical solution of the invention will be clearly and completely described below in conjunction with the accompanying drawings of the invention. Obviously, the embodiments in the following description are merely illustrative ones, and are not all possible ones of the invention. All other embodiments obtained by those ordinarily skilled in the art based on the following ones without creative labor should fall within the protection scope of the invention.

It should be pointed out that, in the description of the invention, the terms such as "middle", "upper", "lower", "left", "right", "inner" and "outer" are used to indicate directional or positional relations based on the accompanying drawings merely for the purpose of facilitating and simplifying the description of the invention, and do not indicate or imply that devices or elements referred to must be in specific directions or be configured and operated in specific directions, so they should not be construed as limitations of the invention. In addition, terms such as "first" and "second" are used for a purpose of description, and should not be construed as indicating or implying relative importance.

Figure 1:
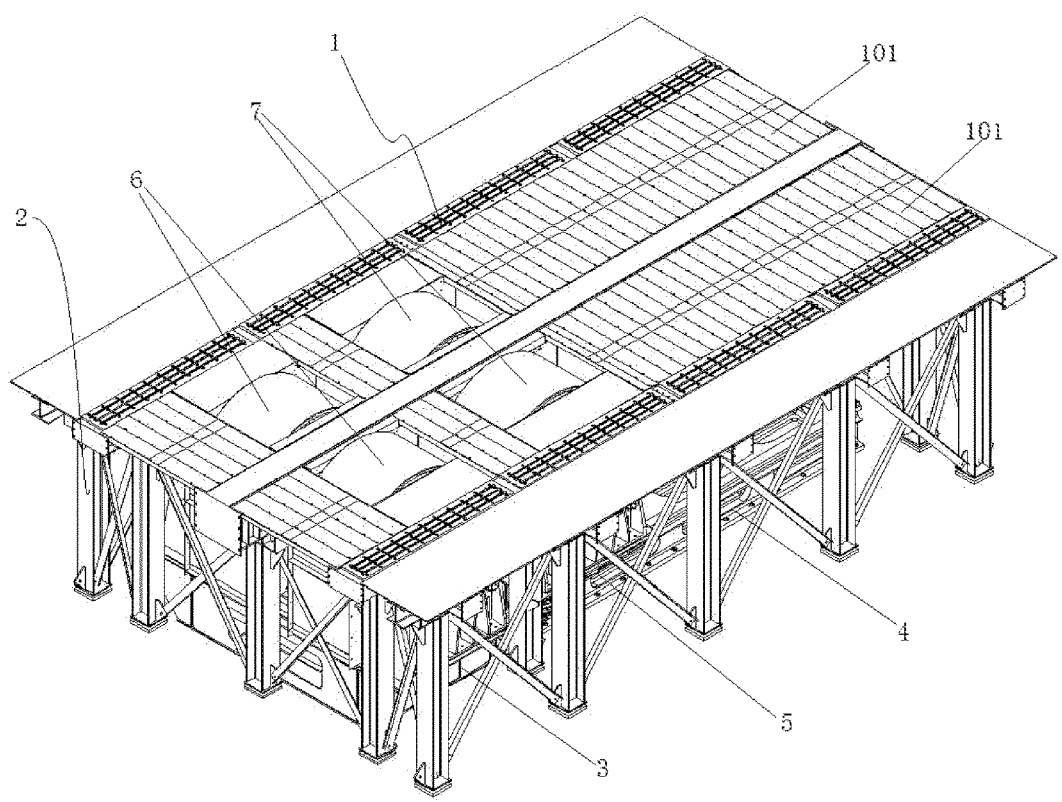
FIG. 1 is an overall schematic diagram of a heavy-duty, high-power and large-torque chassis dynamometer for a multi-environmental system according to the invention.
Figure 2:
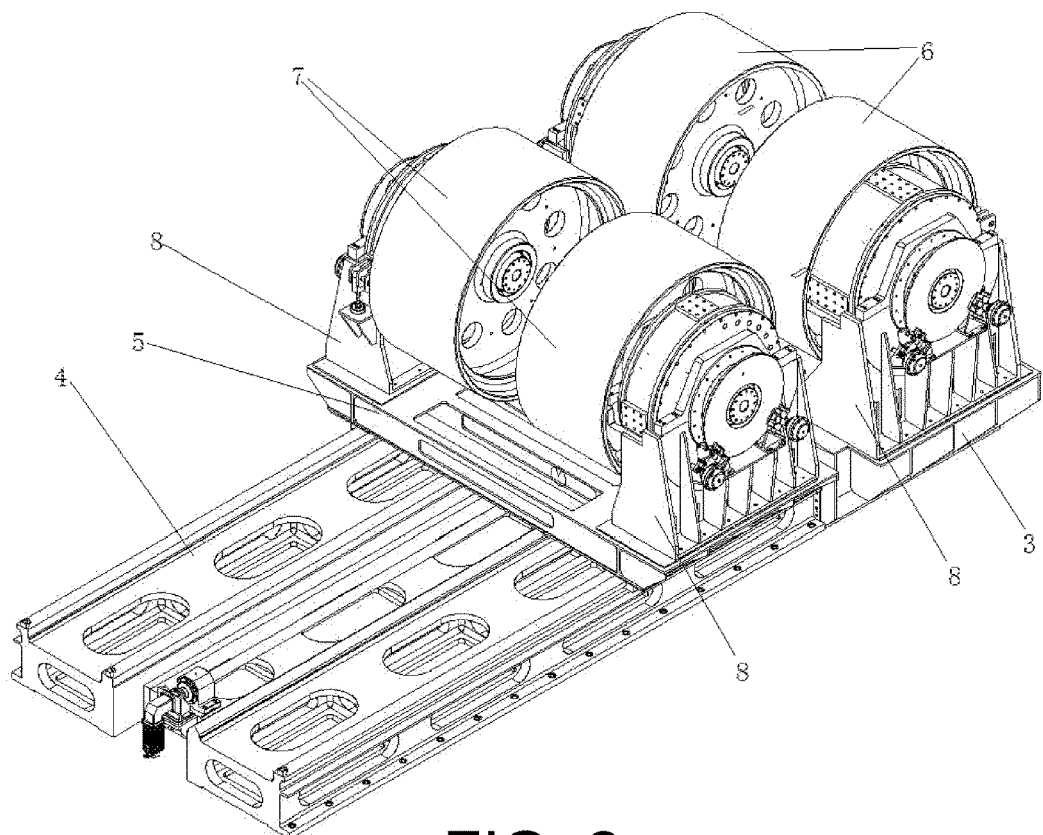
FIG. 2 is a structural diagram of an underground part of the heavy-duty, high-power and large-torque chassis dynamometer for a multi-environmental system according to the invention.
Figure 3:
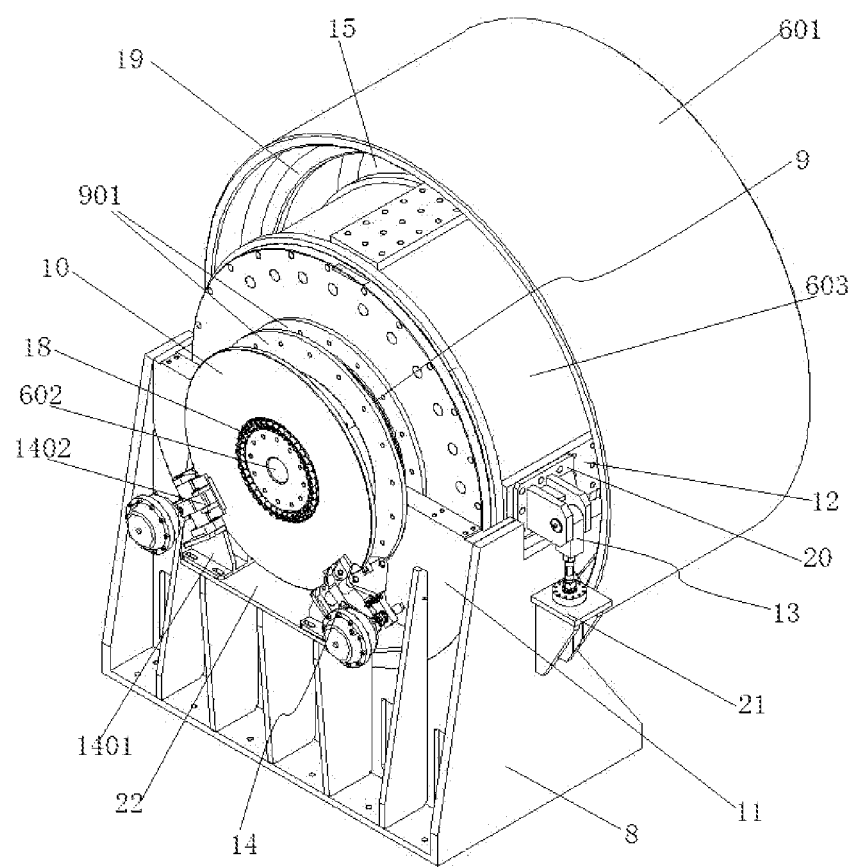
FIG. 3 is a first overall schematic diagram of a first hub assembly according to the invention (the external structure of a second hub assembly is basically the same as that of the first hub assembly)
Figure 4:
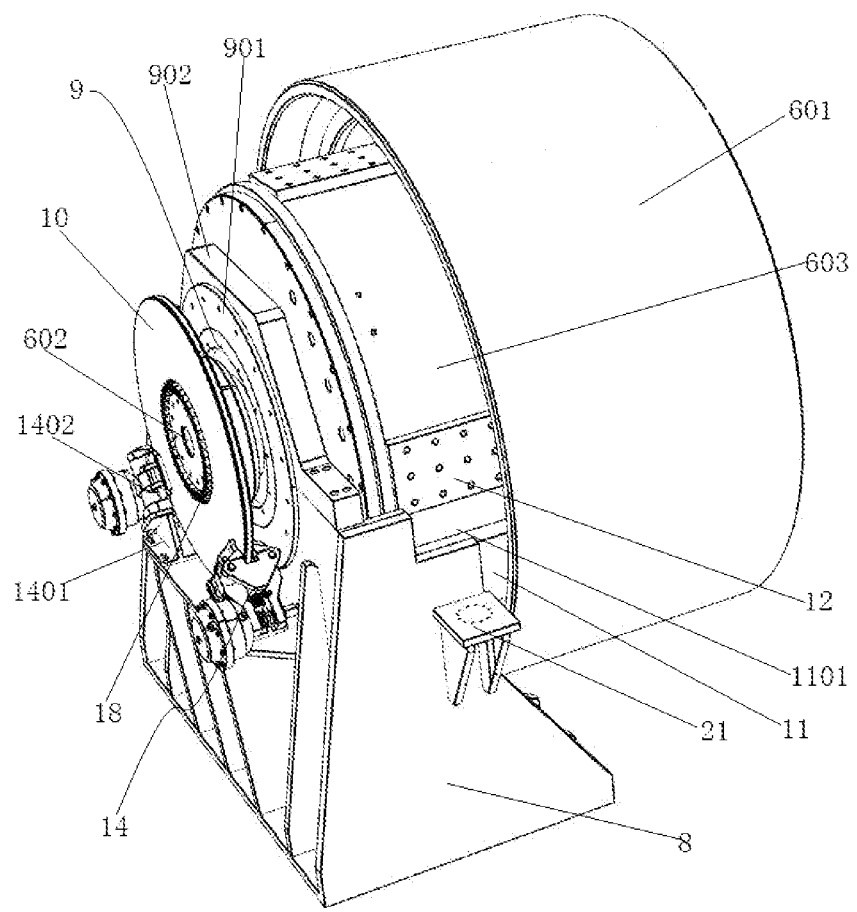
FIG. 4 is a second overall schematic diagram of the first hub assembly according to the invention (the external structure of the second hub assembly is basically the same as that of the first hub assembly)
Figure 5:
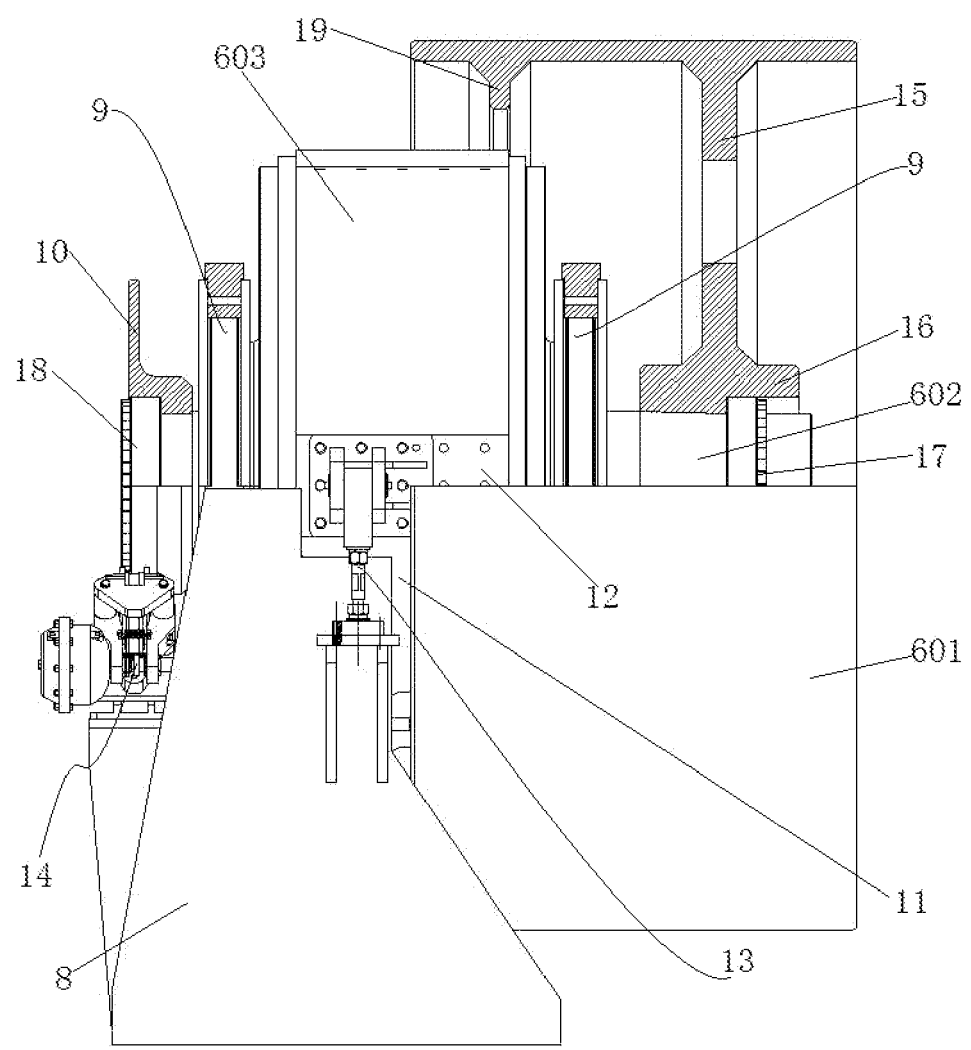
FIG. 5 is a partial sectional view of the first hub assembly according to the invention.
Figure 6:
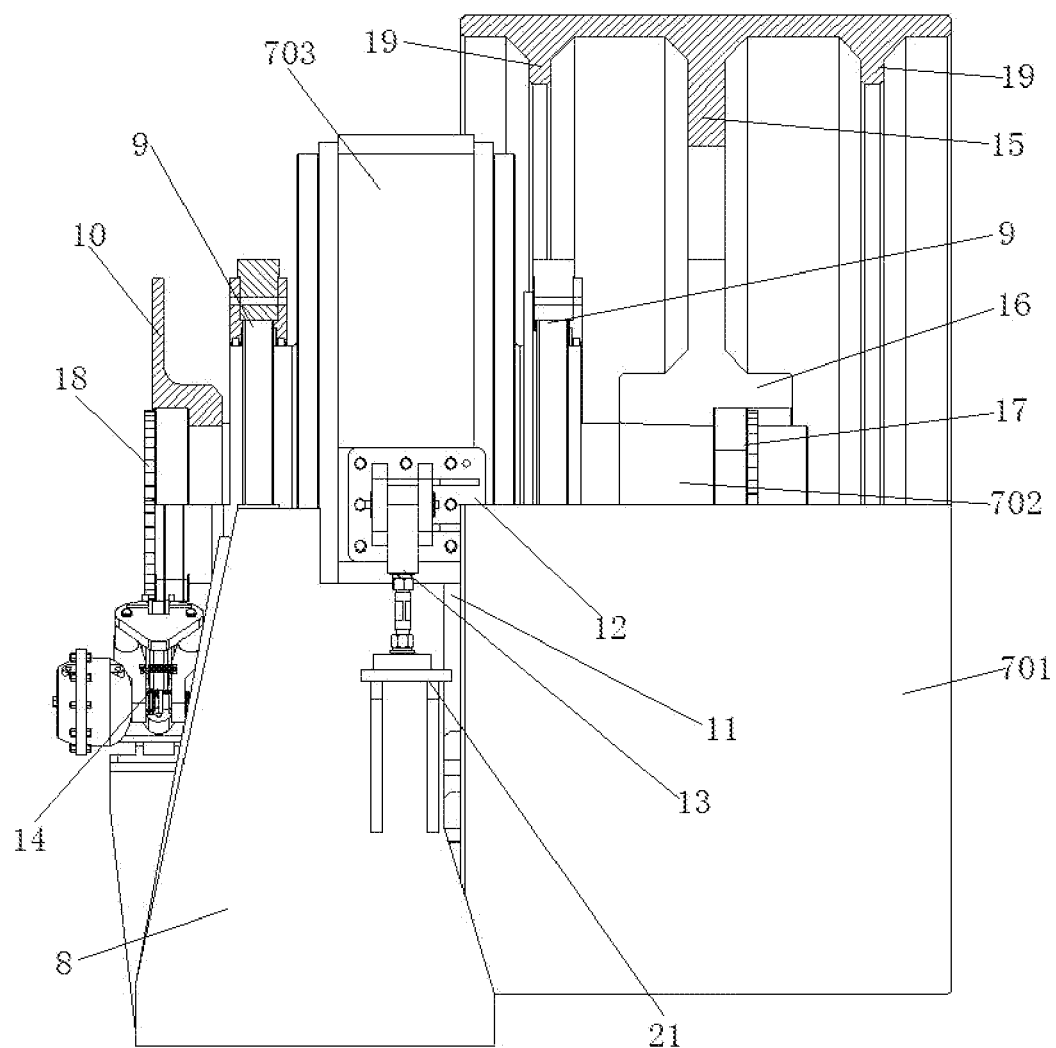
FIG. 6 is a partial sectional view of the second hub assembly according to the invention.

As shown in FIG. 1 and FIG. 2, a heavy-duty, high-power and large-torque chassis dynamometer for a multi-environmental system comprises a power testing platform 1 disclosed on the ground, and a rack 2 located below the power testing platform 1, wherein a fixed base 3 and a sliding base 4 are sequentially arranged on an inner side of the rack 2 in a length direction of the power testing platform 1, a pair of first hub assemblies 6 are mounted on the fixed base 3 through support frames 8, a sliding platform 5 is disposed on the sliding base 4, and a pair of second hub assemblies 7 are mounted on the sliding platform 5 through support frames 8;

As shown in FIG. 3 and FIG. 5, the pair of first hub assemblies 6 each comprise a first hub 601 and a first transmission shaft 602 coaxial with the first hub 601, wherein one end of the first transmission shaft 602 stretches into the first hub 601 and is connected to the first hub 601, the other end of the first transmission shaft 602 extends outwards and is connected to an end flange plate 10 through a second expandable sleeve 18, and a pair of brake assemblies 14 are disposed on the end flange plate 10; a side, close to the first hub 601, of the first transmission shaft 602 is sleeved with a first driving assembly 603, and bearing assemblies 6 are disposed on two sides of the first driving assembly 603 in an axial direction respectively;

As shown in FIG. 6, the pair of second hub assemblies 7 each comprise a second hub 701 and a second transmission shaft 702 coaxial with the second hub 701, wherein one end of the second transmission shaft 702 stretches into the second hub 701 and is connected to the second hub 701, the other end of the second transmission shaft 702 extends outwards and is connected to an end flange plate 10 through a second expandable sleeve 18, and a plurality of brake assemblies 14 are disposed on the end flange plate 10; a side, close to the second hub 701, of the second transmission shaft 702 is sleeved with a second driving assembly 703, and bearing assemblies 9 are disposed on two sides of the second driving assembly 703 in the axial direction respectively;

The bearing assemblies 9 are mounted on the support frames 8 on the corresponding sides through motor mounting bases 11 respectively; tension sensor assemblies 13 are connected to an outer circumference of the first driving assembly 603 and an outer circumference of the second driving assembly 703 respectively and are fixedly disposed on the support frames 8; and the first hub 601 and the second hub 701 are arranged in parallel, part of an outer circumference of the first hub 601 and part of an outer circumference of the first hub 701 are exposed out of the power testing platform 1, and the height of the first hub 601 exposed out of the power testing platform 1 is the same as that of the second hub 701 exposed out of the power testing platform 1.

The dynamometer has the characteristics of heavy duty, high power and large torque; the pair of first hub assemblies 6 are arranged fixedly and the pair of second hub assemblies 7 are arranged slidably, such that the center distance between the two pairs of hub assemblies can be adjusted to test the power of the chassis of different heavy-duty trucks, multiple groups of front wheels can be tested, and front wheels and rear wheels can be tested synchronously, so the application range is wide; each hub assembly is provided with the driving assembly, the brake assemblies 14 and the tension sensor assemblies 13, such that wheels can be tested separately, jointly and differentially to obtain the performance and data of the wheels and chassis more comprehensively; and an environmental test chamber used for simulating one or more environments is arranged to simulate environmental systems under different temperature, humidity and air pressure conditions, such that the performance of a vehicle to be tested can be reflected more accurately.

Through the sliding base 4 and the sliding platform 5, the pair of second hub assemblies 7 which are arranged coaxially can be driven synchronously to adjust the distance to the first hub assemblies 6, and the adjustment range reaches 3000-8500 mm, that is, the minimum distance is less than or equal to 3000 mm and the maximum distance is over 8500 mm. Considering that hubs used for testing the chassis of heavy-duty truck have a large size, the driving assemblies are arranged in the hubs in the invention, such that the axial size can be greatly reduced, the length of the transmission shafts is decreased, the transmission shafts and the hubs can be mounted only through the bearing assemblies 9 and the motor mounting bases 11, the structure is compact, and the support capacity is guaranteed under the precondition that the axial size is reduced.

The tension sensor assemblies 13 are disposed on outer sides of the driving assemblies, so the tension sensor assemblies 13 can support the driving assemblies and directly obtain the stress of the hubs; and the brake assemblies 14 can fulfill a brake function to control the rotational speed of the transmission shafts or stop the transmission shafts and the hubs from rotating.

The first hub assemblies 6 and the second hub assemblies 7 are disposed below the power testing platform 1 (under the ground), and only a small part of the outer circumference of the first hub assemblies 6 and a small part of the outer circumference of the second hub assemblies 7 are located above the power testing platform 1 (over the ground), such that vehicles can be driven onto the hubs directly from the power testing platform 1; and assemblies in the hubs and other components below the power testing platform can be prevented from being exposed to the environmental test chamber on the ground, such that the influence of the simulation of an environmental system in the environmental test chamber on the driving and transmission systems of the dynamometer is reduced, thus reducing test errors.

Further, as shown in FIG. 3-FIG. 6, the bearing assembly 9 comprises main bearings disposed around two ends of an outer shell of the first driving assembly 603 or the second driving assembly 703, wherein the main bearings are mounted at two ends of the corresponding motor mounting base 11 in the axial direction respectively and are provided with bearing end caps 901 on inner and outer sides, and the bearing end caps 901 abut against and are bolted to the motor mounting base 11, a bearing pressing plate 902 is disposed between the bearing end caps 901, and the bearing pressing plate 902 is arc-shaped and has two ends bolted to the motor mounting base 11. The bearing end caps 901 can be further fixed on the motor mounting base 11 through the bearing pressing plates 902, such that axial fluctuations are reduced.

Further, the first hub 601 and the second hub 701 comprise hub bodies which are identical in outer contour and outer diameter, a mounting surface 15 is disposed on an inner circumference of the hub body, a stepped connecting sleeve 16 is disposed in the middle of the mounting surface 15, and the first expandable sleeve 17 is sleeved with the connecting sleeve 16 and is disposed around the end of the first transmission shaft 602 or the second transmission shaft 702; a plurality of circumferential reinforcing ribs 19 are disposed on the inner circumference of the hub body; in the first hub assembly 6, a first driving motor has a larger size and higher power, thus occupying more space, so the mounting surface 15 is not disposed in the middle, and the circumferential reinforcing ribs 19 are symmetrical with the mounting surface 15; and in the second hub assembly 7, the mounting surface 15 is disposed in the middle, and a pair of circumferential reinforcing ribs 19 are symmetrically disposed on two sides of the mounting surface 15 respectively;

A plurality of through holes are formed in the mounting surface 15 in the axial direction. An axis of the first transmission shaft 602 and an axis of the second transmission shafts 702 are located in the same horizontal plane.

By adopting this structure, the internal space can be reasonably used for installing other parts under the condition that a large size of the outer circumference is guaranteed; because the power and size of the first driving assembly 603 are different from those of the second driving assembly 703, the positions of the mounting surfaces 15 in the hub bodies may be different to ensure the wheelbase and the center distance; and by arranging the circumferential reinforcing ribs 19, the strength and balance performance of the hub body can be further improved.

The coaxiality of the first hub assemblies 6 or the second hub assemblies 7 which are arranged coaxially is less than or equal to 0.5 mm, and the degree of parallelism of the first hub assemblies 6 and the second hub assemblies 7 which are arranged in the front-back direction is less than or equal to 1 mm.

Figure 7:
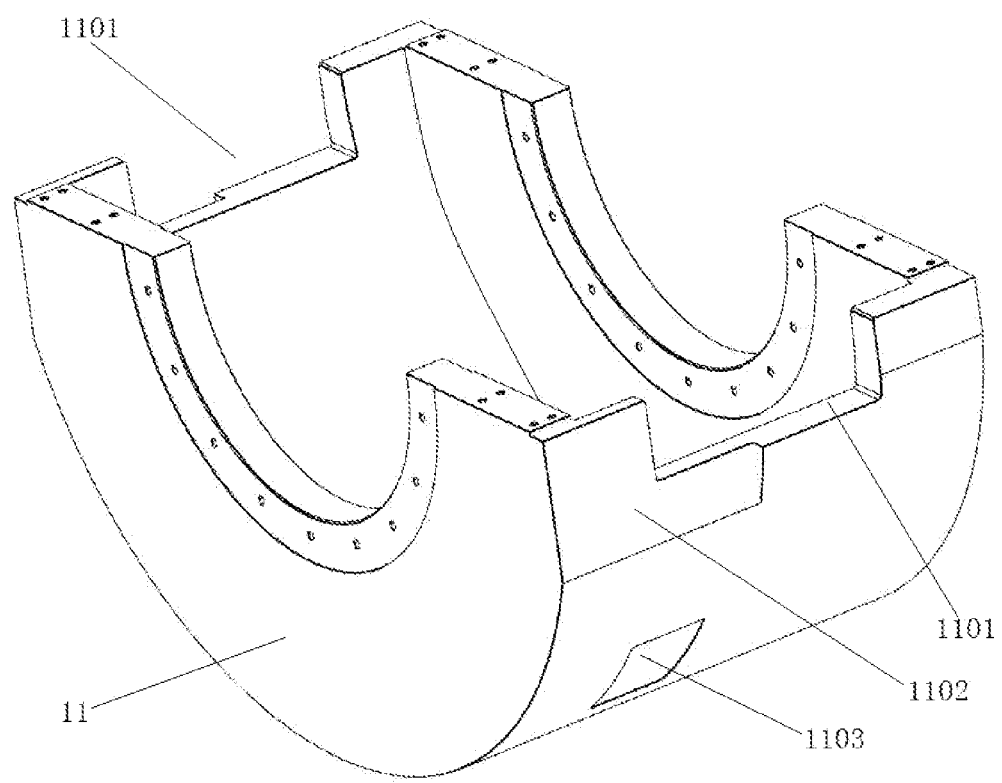
FIG. 7 is a three-dimensional structural view of a motor mounting base according to the invention.
Figure 8:
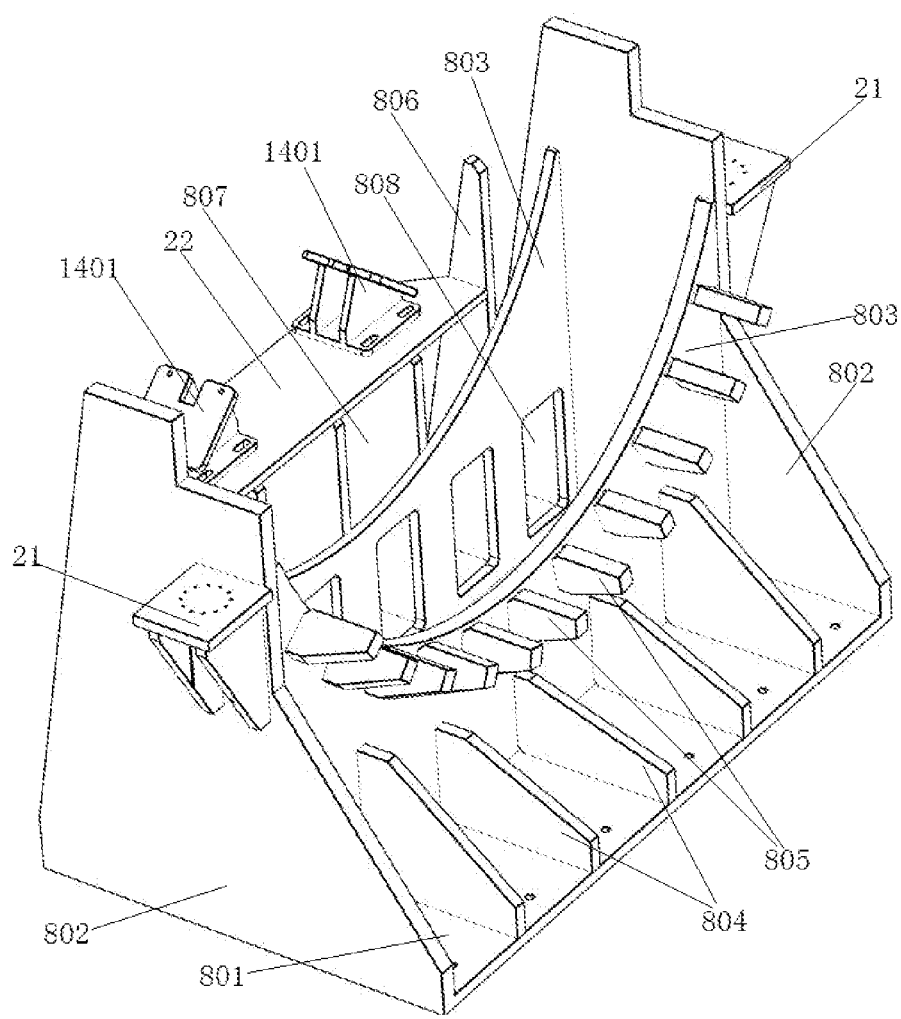
FIG. 8 is a first three-dimensional structural view of a support frame according to the invention.
Figure 9:
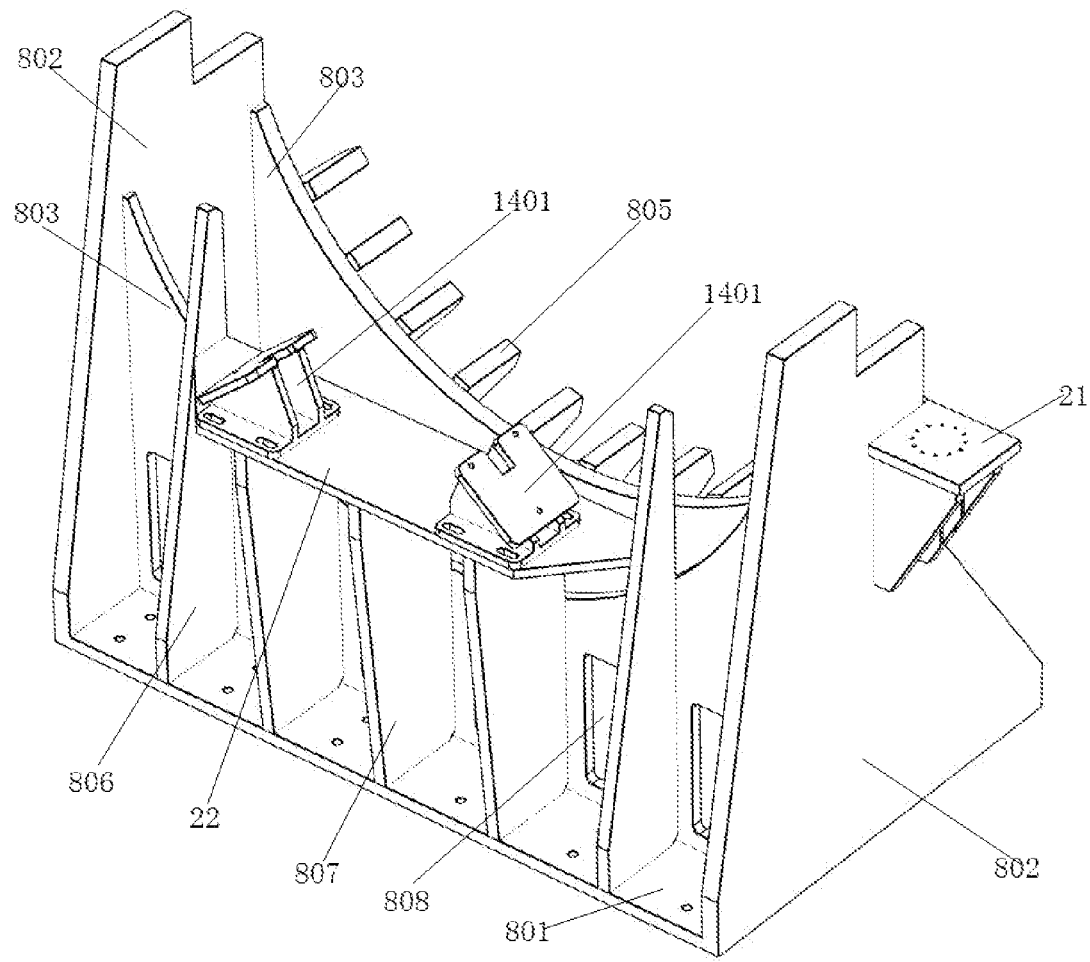
FIG. 9 is a second three-dimensional structural view of the support frame according to the invention.

Further, as shown in FIG. 7-FIG. 9, the support frame 8 is a plate frame structure and comprises a base plate 801 which is bolted and mounted on the fixed base or the sliding platform, a pair of parallel side plates 802 are disposed on two sides of the base plate 801, a plurality of arc-shaped support plates 803 are disposed between the pair of side plates 802, and the motor mounting base 11 is disposed on the arc-shaped support plates 803; the two ends of the motor mounting base 11 in the axial direction are connected to the bearing assemblies 9 respectively, an end, away from the end flange plate 10, of the motor mounting base 11 stretches into the first hub 601 or the second hub 701, a first mounting plate 22 is connected to an outer side of the other end of the motor mounting base 11, and the brake assemblies 14 are mounted on the first mounting plate 22; and second mounting plates 21 are disposed on outer sides of the side plates 802, and the tension sensor assemblies 13 are mounted on the second mounting plates 21.

The support frame 8 is made by welding plates, and the two arc-shaped support plates 803 can support and fix the motor mounting base 11 to support the corresponding transmission shaft and hub; the driving assemblies are further supported by the tension sensor assemblies 13 stably to form cantilever supporting and connecting structures, which rotationally support the hubs together with the brake assemblies 14 at the ends and reduce the axial width.

Further, a pair of arc-shaped support plates 803 are arranged in parallel, one arc-shaped support plate 803 is disposed on and supports one end of the motor mounting base 11, and the other arc-shaped support plate 803 is disposed in and supports the middle of the motor mounting base 11; a plurality of oblique rib plates are disposed between the arc-shaped support plates 803 and the base plate 801, as well as between the arc-shaped support plates 803 and the outer circumference of the motor mounting base 11, and the bottom and two sides of the first mounting plate 22 are connected to the oblique rib plates on the corresponding sides respectively; and a plurality of through grooves 808 are formed in the arc-shaped support plates 803 close to the end of the motor mounting base 11, and a radial through groove 1103 is formed in the outer circumference of the motor mounting base 11.

The arc-shaped support plate 803 on the outer side is exactly flush with an outer end face of the motor mounting base 11, and the arc-shaped support plate 803 on the inner side supports the middle of the motor mounting base 11 and is close to the end of the hub, such that the hub is supported and can rotate without being affected.

The oblique rib plates disposed at different positions have different functions and effects; first rib plates 804 are welded between the arc-shaped support plate 802 on the inner side and the base plate 801 at equal intervals to improve the connecting and supporting strength of the arc-shaped support plate 803 on the inner side; first support rib plates 805 are welded between the arc-shaped support plate 803 on the inner side and the motor mounting base 11 at equal intervals and are distributed along the outer circumference of the motor mounting base 11 to increase the support distance and area in the axial direction; second support rib plates 807 are welded between the arc-shaped support plate 803 on the outer side and the base plate 801 and are big-end-up, thus being able to support the first mounting plate 22; and second rib plates 806 are disposed on two sides of the second support rib plate 807, extend upwards and are welded to the end face of the motor mounting base.

Further, the side plate 802 is a multi-step trapezoidal plate, the size of the upper portion of the side plate 802 is less than that of the lower portion of the side plate 802, and the side plate 802 in this shape can enlarge the support area and occupy less space, and components above can be connected more compactly; the center of the side plate 802 is located in the plane where the center line of the base plate 801 is located, so the stability is better; the motor mounting base 11 is a semicircular groove structure, and the first driving assembly or the second driving assembly is disposed in the motor mounting base 11; and two sides, close to the side plates, of the outer circumference of the motor mounting base 11 are planar structures 1102 and closely abut against inner sides of the side plates 802, and grooves 1101 are formed in the outer circumference of the motor mounting base 11 close to steps of the side plates 802 to be used for connecting and mounting the tension sensor assemblies 13.

Further, the pair of brake assemblies 14 are arranged symmetrically and each comprise a brake mount 1401, brakes 1402 are mounted on the brake mounts 1401 respectively, the brakes 1402 are clamp brakes, and a pair of clamps of each brake 1402 are disposed on inner and outer sides of the corresponding end flange plate 10 respectively; and the brake mount 1401 comprises a first connecting plate, a pair of second connecting plates and a third connecting plate, the first connecting plate is bolted to the support frame, the pair of second connecting plates are disposed between the first connecting plate and the third connecting plate, an acute angle is formed between the third connecting plate and the first connecting plate, the brake 1402 is bolted to the third connecting plate, and receding grooves are formed in ends, close to the clamps, of the third connecting plate.

Figure 10:
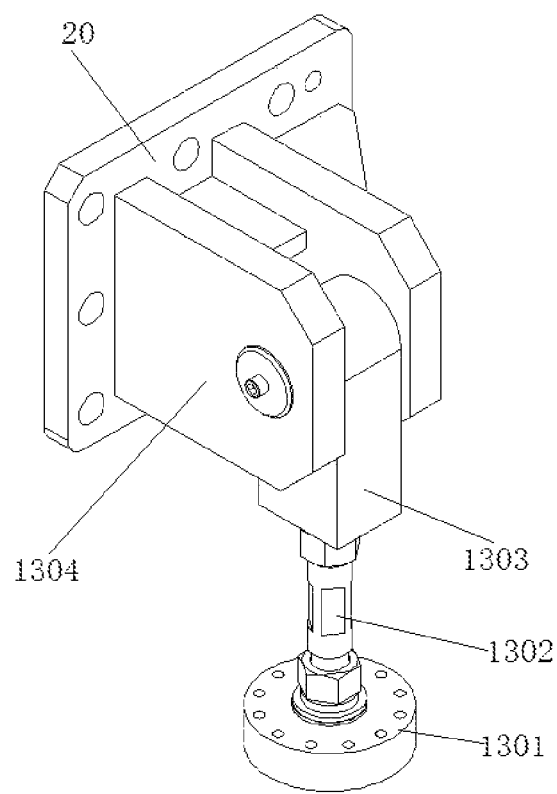
FIG. 10 is a three-dimensional structural view of a tension sensor assembly according to the invention.

Further, as shown in FIG. 3 and FIG. 10, the tension sensor assembly 13 comprises a tension base 20 which is bolted and fixed to an axial mounting plate 12 on the outer circumference of the first driving assembly 603 (or the second driving assembly), a tie-rod nut 1303 is movably connected to the tension base 20 through a pair of connecting pieces 1304, a screw 1302 is connected to the end of the tie-rod nut 1303, and a tension sensor 1301 is bolted to the end of the screw 1302 and is bolted and fixed to the second mounting plate 21 of the support frame 8; and one pair of tension sensor assemblies 13 are symmetrically disposed on the outer circumference of each first driving assembly 603 or each second driving assembly 703.

Further, one end of the sliding base 4 is bolted and fixed to one end of the fixed base 3, a plurality of sliding rails and guide rails are disposed on the sliding base 4, the sliding platform 5 is slidably disposed on the sliding rails and the guide rails, and the sliding platform 5 is connected to a drive through a transmission assembly; upper cover plates 101 are detachably mounted on two sides of the power testing platform 1 located above the sliding base 4, a vehicle moves on the upper cover plates 101, the underground space and the environmental test chamber can be separated by the upper cover plates 101, and upper cover plates 101 detachably connected to the power testing platform 1 can be flexibly adjusted according to the center distance between the front hubs and the rear hubs; and the rack 2 is a steel frame structure, and is connected to and supports the power testing platform 1.

Further, the first driving assembly 603 and the second driving assembly 703 are permanent magnet synchronous motors and can direct act on and drive the corresponding transmission shafts to rotate so as to drive the hubs to rotate; the first driving assembly 603 and the second driving assembly 703 each comprises a shell in the circumferential direction and covers at the ends, the covers are bolted to two sides of the shell respectively, the middle of each cover protrudes outwards and is connected to the corresponding bearing assembly 9, and a plurality of wire holes and air holes are formed in the covers in in the axial direction; and stator assemblies of motors are mounted in the shell, and rotor parts of the motors are disposed around and connected to the transmission shafts.

Although the embodiments of the invention have been illustrated and described above, those ordinarily skilled in the art can understand that various transformations, amendments, substitutions and modifications can be made to these embodiments. The scope of the invention is defined by the appended claims and their equivalents.

What is claimed is:

1. A heavy-duty, high-power and large-torque chassis dynamometer for a multi-environmental system, comprising a power testing platform and a rack located below the power testing platform, wherein a fixed base and a sliding base are disposed on the rack, support frames are mounted on the fixed base and the sliding base, and a plurality of hub assemblies are disposed on the support frames;

each said hub assembly comprises a transmission shaft and a hub connected to the transmission shaft, a plurality of brake assemblies are disposed between an end, extending outwards, of the transmission shaft and the corresponding support frame, and a side, close to the hub, of the transmission shaft is sleeved with a driving assembly; and two ends of the driving assembly are sleeved with bearing assemblies respectively and are disposed on the corresponding support frames through motor mounting bases, a plurality of tension sensor assemblies are disposed between an outer circumference of the driving assembly and the corresponding support frames, and the hub partially stretches out of the power testing platform.

2. The heavy-duty, high-power and large-torque chassis dynamometer for a multi-environmental system according to claim 1, wherein each said bearing assembly comprises main bearings disposed around the corresponding driving assembly, bearing end caps are disposed at two ends of each said main bearing respectively, and the bearing end caps abut against and are bolted to the corresponding motor mounting base, and a bearing pressing plate is disposed between the bearing end caps and is bolted to the corresponding motor mounting base.

3. The heavy-duty, high-power and large-torque chassis dynamometer for a multi-environmental system according to claim 1, wherein the plurality of hubs each comprise a hub body, and a mounting surface is disposed on an inner circumference of the hub body and is connected to an end of the transmission shaft; a plurality of circumferential reinforcing ribs are disposed on the inner circumference of the hub body; and a plurality of through holes are formed in the mounting surface in an axial direction.

4. The heavy-duty, high-power and large-torque chassis dynamometer for a multi-environmental system according to claim 1, wherein at least one pair of brake assemblies are arranged symmetrically and each comprise a brake mount, brakes are mounted on the brake mounts respectively, and a pair of clamps of each said brake are disposed on inner and outer sides of an end flange plate of the transmission shaft; and each said brake mount comprises a first connecting plate bolted to the corresponding support frame, the first connecting plate is connected to an oblique third connecting plate through a plurality of second connecting plates, the corresponding brake is bolted to the third connecting plate, and receding grooves are formed in ends, close to the clamps, of the third connecting plate.

5. The heavy-duty, high-power and large-torque chassis dynamometer for a multi-environmental system according to claim 1, wherein each said tension sensor assembly comprises a tension base which is bolted and fixed to an outer circumference of the corresponding driving assembly, a tie-rod nut is connected to the tension base, a screw is connected to an end of the tie-rod nut, and a tension sensor is bolted to an end of the screw and is bolted and fixed to the corresponding support frame.

6. The heavy-duty, high-power and large-torque chassis dynamometer for a multi-environmental system according to claim 1, wherein an end of the sliding base is bolted and fixed to an end of the fixed base, a sliding platform is disposed on the sliding base, and the sliding platform is connected to a drive through a transmission assembly; and upper cover plates are detachably mounted on two sides of the power testing platform located above the sliding base, and the rack is a steel frame structure, and is connected to and supports the power testing platform.

7. The heavy-duty, high-power and large-torque chassis dynamometer for a multi-environmental system according to claim 1, wherein the driving assemblies are direct drive motors or permanent magnet synchronous motor.

8. The heavy-duty, high-power and large-torque chassis dynamometer for a multi-environmental system according to claim 1, wherein each said support frame comprises a base plate, side plates are disposed on two sides of the base plate, a plurality of arc-shaped support plates are disposed between the side plates, and the corresponding motor mounting base is disposed on the arc-shaped support plates; and one end of each said motor mounting base stretches into the corresponding hub, a first mounting plate is connected to an outer side of the other end of each said motor mounting base, the brake assemblies are mounted on the first mounting plate, second mounting plates are disposed on outer sides of the side plates, and the tension sensor assemblies are mounted on the second mounting plates.

9. The heavy-duty, high-power and large-torque chassis dynamometer for a multi-environmental system according to claim 8, wherein at least two arc-shaped support plates are arranged in parallel, one said arc-shaped support plate is disposed at and supports an end of the motor mounting base, and the other arc-shaped support plate is disposed in and support a middle of the motor mounting base; and a plurality of oblique rib plates are disposed between the arc-shaped support plates and the base plate, as well as between the arc-shaped support plates and an outer circumference of the motor mounting base.

10. The heavy-duty, high-power and large-torque chassis dynamometer for a multi-environmental system according to claim 8, wherein the side plates are multi-step trapezoidal plates; the motor mounting bases are semicircular groove structures, and the driving assemblies are disposed in the semicircular groove structures respectively; and two sides, close to the side plates, of an outer circumferential surface of the motor mounting base are planar structure and closely abut against inner sides of the side plates.

* * * * *